Oct. 6, 1970  G. G. KLOCK  3,533,026
ELECTROCHEMICAL APPARATUS
Filed May 17, 1968
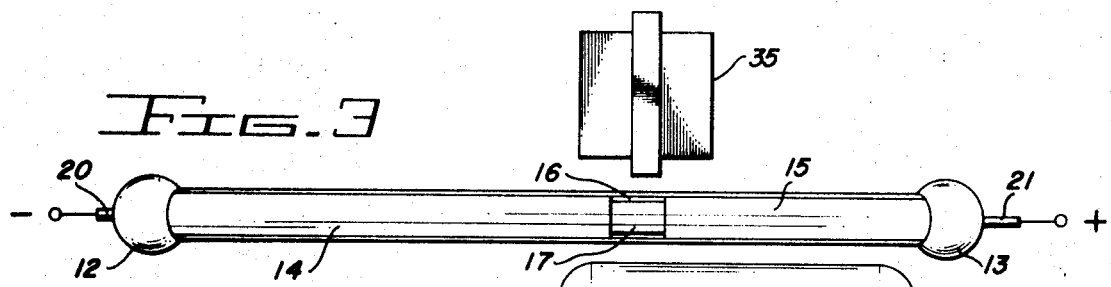
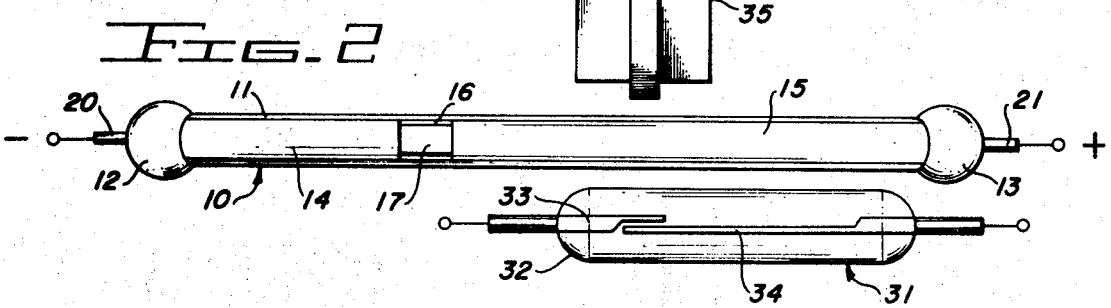
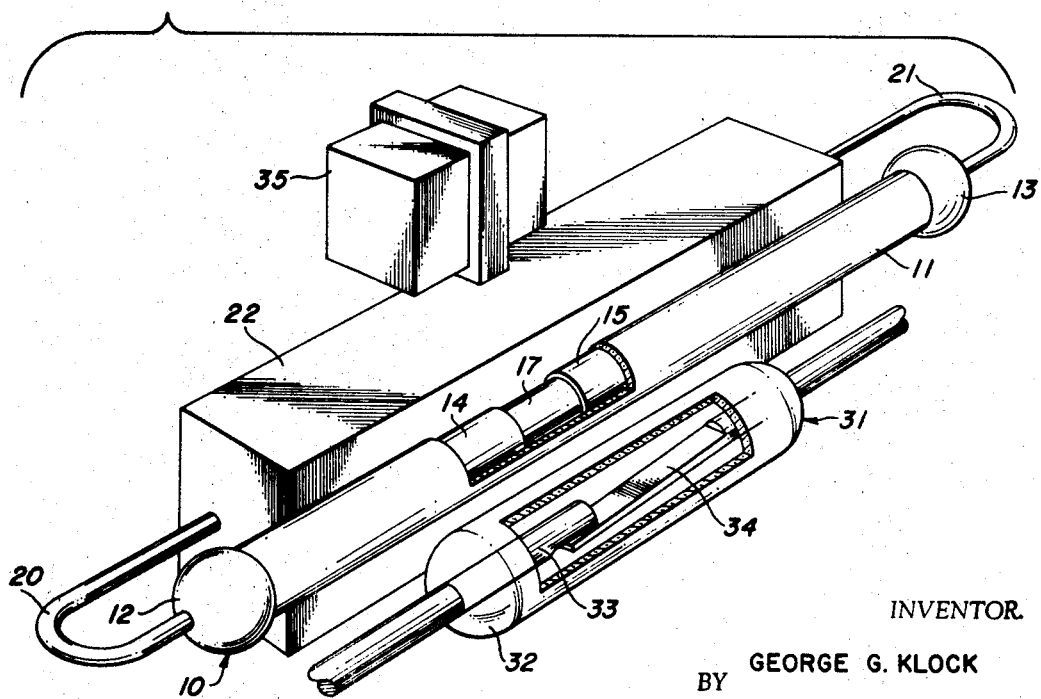
INVENTOR.
GEORGE G. KLOCK
BY
*Drummond & Cahill*
ATTORNEYS

United States Patent Office 3,533,026
Patented Oct. 6, 1970

3,533,026
ELECTROCHEMICAL APPARATUS
George G. Klock, Phoenix, Ariz., assignor to UMC Industries, Inc., a corporation of Delaware
Filed May 17, 1968, Ser. No. 729,988
Int. Cl. H01h 3/00
U.S. Cl. 335—179      2 Claims

ABSTRACT OF THE DISCLOSURE

Apparatus employing an electrochemical cell to control the magnetic actuation of a reed switch. Movement of an iron slug in the electrochemical cell is proportional to current flow through the cell and switch actuation occurs as the iron slug assumes a predetermined position between the switch and a source of magnetic flux.

BACKGROUND OF THE INVENTION

Field of the invention

This invention relates to electrical measurement systems and, more particularly, to an arrangement for indicating the output of such measurement systems. Specifically, this invention relates to a switching arrangement for indicating the output of an electrochemical measurement device and also relates to an electrical switching arrangement for introducing a controlled time delay between a reference time and actuation of an electrical switch.

Description of the prior art

It is often desirable in measurement control systems to integrate with respect to time the electrical current that flows in a circuit. Mercury coulometers have been used for this purpose and provide highly accurate measurements. In such devices, the total movement of an electrolyte gap between two mercury columns is directly proportional to the current-time integral.

Mercury coulometers provide no direct output indicating movement of the electrolyte gap to a selected position and thus measurement of a corresponding current-time integral. An electro-optical arrangement employing a light source and sensing device has been employed to detect movement of the electrolyte gap to a selected position. However, such an arrangement requires dissipation of power to energize the light source and is inefficient. Accordingly, it is desirable to provide an improved detection arrangement.

It is therefore an object of this invention to provide an improved and simplified arrangement for detecting the measurement of a predetermined current-time integral in an electrochemical cell.

It is another object of this invention to provide an efficient arrangement for detecting a selected position of the electrolyte gap in an electrochemical cell.

It is another object of this invention to provide improved coulometer apparatus.

It is a further object of this invention to provide an improved time-delay device.

SUMMARY OF THE INVENTION

The foregoing objects are achieved, in accordance with the illustrated embodiment of the invention, by providing an iron slug positioned in the electrolyte gap between two columns of mercury in a mercury coulometer. A read switch and a maget are positioned on opposite sides of the coulometer and spaced so that the magnetic flux of the magnet is insufficient to actuate the reed switch. The electrolyte gap and iron slug of the coulometer move in direct proportion to the current-time integral as current flows through the coulometer. When the iron slug is positioned between the magnet and the reed switch, the permeability of the space between the magnet and the switch increases greatly, causing actuation of the switch.

BRIEF DESCRIPTION OF THE DRAWINGS

The subject matter of the invention is particularly pointed out and distinctly claimed in the concluding portion of the specification. The invention, however, both as to organization and method of operation, may best be understood by reference to the following description taken in connection with the accompanying drawings, in which:

FIG. 1 illustrates the apparatus of the invention;

FIG. 2 illustrates the apparatus of FIG. 1 prior to actuation of the switch to provide an output signal; and FIG. 3 illustrates the apparatus of FIG. 1 wherein actuation of the switch has occurred.

DESCRIPTION OF THE PREFERRED EMBODIMENT

Referring to FIG. 1, a mercury coulometer 10 is provided comprising glass capillary tubing 11 and electrodes 12 and 13 which seal the ends of tubing 11. Tubing 11 is filled with two columns of mercury 14 and 15 separated by an indicating gap. Mercury column 14 is in electrical contact with electrode 12 while mercury column 15 is in electrical contact with electrode 13. The indicating gap between mercury columns 14 and 15 is formed by an electrolyte 16. Electrolyte 16 is selected so as to be immiscible with mercury and may be, for example, ferrous iodide ($FeI_2$). An iron slug 17 is provided in the electrolyte indicating gap, as illustrated in FIG. 1. The slug is covered with a suitable insulating coating so that it will not conduct electrical current between the mercury columns.

Electrical conductor 20 is connected to electrode 12 while electrical conductor 21 is connected to electrode 13 of coulometer 10. Both conductors 20 and 21 are connected to a source 22 of DC signals. Source 22 may comprise any desired source of continuous or pulsed DC signals. Source 22 may be a source of constant current for application to coulometer 10 or, alternatively, may comprise a sensing device such as a photocell responsive to a variable parameter to provide a DC output signal. Source 22 therefore provides DC signals for application between electrodes 12 and 13 of coulometer 10.

In the operation of coulometer 10, electrical current flows through coulometer 10 between electrodes 12 and 13 in response to continuous or pulsed DC signals from source 22. This current flow causes mercury at one of the electrodes, called the anode, to be electrochemically transferred across the electrolyte indicating gap to the other electrode, called the cathode, at a time rate proportional to the current. The transfer of mercury across the electrolyte indicating gap effectively moves the gap along the length of tubing 11. Assuming uniformity of inside diameter of tubing 11, the gap movement is directly proportional to the current-time integral, as known in the art.

Operation of the coulometer 10 is in accordance with Faraday's Laws of Electrolysis, which state:

(1) The amount of current-produced electrochemical decomposition is proportional to the quantity of electricity passed, and (2) The amounts of different substances deposited by a fixed quantity of electricity are proportional to their chemical equivalent weights.

The international ampere is defined on this basic as that amount of current which, flowing uniformity for one second, will deposit 1.118 milligrams of silver. This is electrochemically equivalent to 1.036 milligrams of mercury for each coulomb (ampere-second of charge).

The linearity between gap displacement and coulombs passed can be expressed as follows: a variable current I, maintained for a time, t, transfers m grams of material of molecular weight W and valence j according to Faraday's laws:

$$m = C_1 \int_0^t I\,dt$$

where $$C_1 = \frac{W}{jF}$$

and F=96.494 coulombs.

Where liquid mercury of density $t$ is transferred in a capillary bore of diameter $d$, gap displacement L can be computed:

$$L = \frac{4m}{p\pi d^2} = C_2 m$$

where $$C_2 = \frac{4}{p\pi d^2}$$

therefore:

$$L = C \int_0^t I\,dt$$

where $$C = C_1 C_2 = \frac{4W}{jp\pi d^2 F}$$

The constant C is called the "meter constant" and equals .096 inch of gap travel per milliampere-hour for a bore diameter of .015 inch.

The electrolyte solution that forms the indicating gap provides iodide ions, the flow of iodide ions in the electrolyte electrically balancing the flow of mercuric ions through the gap, as known in the art. Oxidation of the mercury occurs at the anode electrode while reduction of the mercuric ions occurs at the cathode electrode of the coulometer. The electrode reactions are completely symmetrical and the system is reversible.

In accordance with the invention, a reed switch 31 is positioned on one side of coulometer tubing 11 at a predetermined location along the length of tubing 11. Reed switch 31, as known in the art, comprises a glass envelope 32 with pole piece 33 and armature 34 mounted within envelope 32. The ends of pole piece 33 and armature 34 extend through envelope 32 to provide electrical leads to permit appropriate electrical connections to be made to switch 31. Switch 31 is normally open, i.e., armature 34 and pole piece 33 are normally not in contact. In the operation of reed switch 31, armature 34 is moved toward and contacts pole piece 33 to provide electrical conductivity through switch 31 when a magnetic flux field of sufficient density is provided so that the resultant force on armature 34 is sufficient to move armature 34 into contact with pull piece 33.

As shown in FIG. 1, a permanent magnet 35 is positioned adjacent coulometer tubing 11 on the side of tubing 11 directly opposite switch 31 and at approximately the same location along the length of tubing 11. The strength of the magnetic flux field provided by magnet 35 and the spacing of magnet 35 and switch 31 on opposite sides of coulometer 10 are selected so that the flux field of magnet 35 is not sufficient to actuate switch 31 when one of the mercury columns is between magnet 35 and switch 31. This condition of operation of the apparatus is illustrated in FIG. 2 of the drawings.

During operation of the apparatus of the invention, as the current-time integral increases and the electrolyte indicating gap including iron slug 17 moves into position between magnet 35 and switch 31, iron slug 17 greatly increases the permeability of the space between magnet 35 and armature 34 and pole piece 33 of switch 31. The magnetic flux field available at switch 31 is then sufficient to force armature 34 to move into contact with pole piece 33, actuating switch 31 and closing a suitable electrical circuit to provide a signal indicating measurement of a predetermined current-time integral by coulometer 10. This condition of operation of the apparatus is illustrated in FIG. 3 of the drawings. The relative positions of magnet 35 and switch 31 are selected so that switch actuation occurs at a predetermined position of the electrolyte indicating gap which corresponds to a desired current-time integral.

Thus, in accordance with the invention, a simple and dependable device is provided for detecting a selected current-time integral in a coulometer. If it is desired to provide a predetermined time delay from a reference time, an appropriate constant current may be applied from source 22 to the coulometer and switch actuation will occur when the electrolyte indicating gap has moved between the magnet and the switch upon expiration of the selected time delay.

There has been described herein apparatus embodying the instant invention. Although the principles of the invention have now been made clear in an illustrative embodiment, there will be immediately obvious to those skilled in the art many modifications in structure, arrangement, proportions, elements, materials and components used in the practice of the invention, and otherwise, which are particularly adopted for specific environments and operating requirements. The appended claims are therefore intended to cover and embrace any such modifications, within the limits only of the true spirit and scope of the invention.

I claim:
1. In combination,
  (a) a coulometer comprising two mercury columns separated by an electrolyte-containing indicating gap, said electrolyte being immiscible with mercury,
  (b) a member of ferro-magnetic material positioned in the indicating gap of said coulometer which moves with the indicating gap,
  (c) means applying an electrical signal to said coulometer to cause movement of the indicating gap, and
  (d) magnetic means positioned adjacent said coulometer and including switch means responsive to the position of the indicating gap and said member of ferro-magnetic material for providing an output signal when the indicating gap reaches a predetermined position.

2. The combination of claim 1, in which said magnetic means includes a magnet positioned on the side of said coulometer opposite said switch means.

References Cited

UNITED STATES PATENTS 3,009,033  11/1961  Werts _____ 335—207
3,045,178  7/1962   Corrsin _____ 200—152

BERNARD A. GILHEANY, Primary Examiner

H. BROOME, Assistant Examiner

U.S. Cl. X.R.

324—94; 200—152